May 3, 1932. C. G. OHLSON 1,856,111
APPARATUS FOR HANDLING AND SHEARING METAL STRIP
Filed Aug. 13, 1930
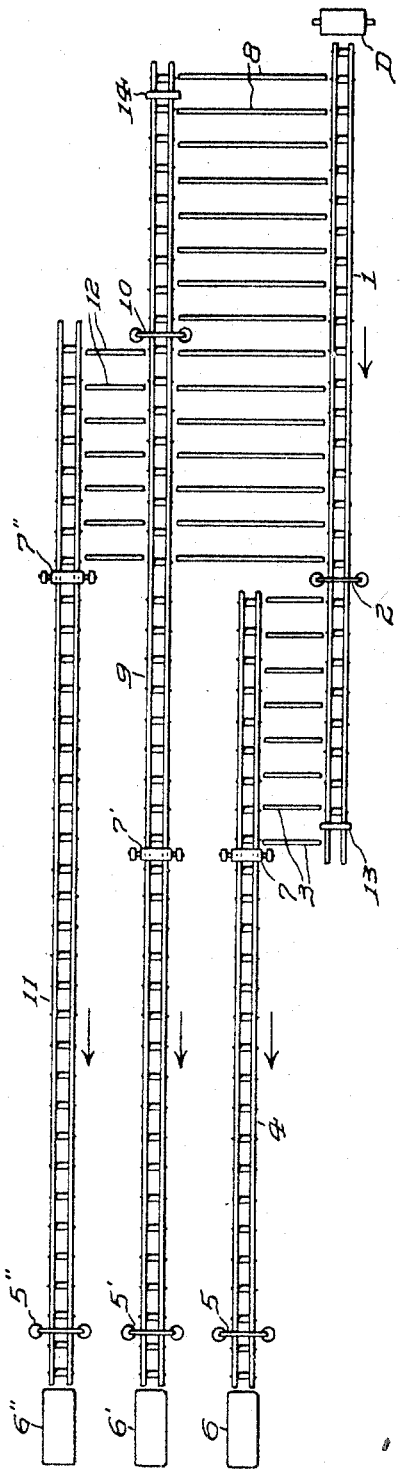
INVENTOR
Carl G. Ohlson.
BY
ATTORNEYS
WITNESS
F. J. Hartman.

Patented May 3, 1932

1,856,111

UNITED STATES PATENT OFFICE

CARL G. OHLSON, OF YOUNGSTOWN, OHIO, ASSIGNOR TO THE YOUNGSTOWN SHEET AND TUBE COMPANY, OF YOUNGSTOWN, OHIO, A CORPORATION OF OHIO

APPARATUS FOR HANDLING AND SHEARING METAL STRIP

Application filed August 13, 1930. Serial No. 474,931.

My invention relates to the handling of steel or other metallic strip after it is delivered from the mill in which it is rolled, the general purpose of the invention being to facilitate the handling and cutting up of the strip, to reduce the initial cost of the apparatus necessary therefor, and to minimize the operating costs incident thereto.

I shall herein refer more particularly to the practice of the invention in connection with the manufacture of steel strip as the invention is particularly applicable thereto, although it may frequently be advantageously utilized in connection with other sorts of metal strip.

Steel strip is delivered from the strip mill in long lengths and with extreme rapidity, a strip 300 feet long being frequently run out from the mill every forty seconds. It is therefore impossible to level and shear the strip upon the run-out table since the succeeding strip would be delivered thereto before completion of the said operations on the preceding one. Various expedients have consequently been suggested for overcoming this difficulty, a common one being to lift each strip from the run-out table and transport it to a suitable point for leveling and shearing by means of a crane of substantially the same length as the strip and having hooks for engaging the strip disposed at short intervals, thus clearing the run-out table for the reception of the following strip. Owing to their large size these cranes are extremely expensive as well as unhandy and difficult to manage so that their use, while reasonably effective for accomplishing the desired result of clearing the run-out table, is not particularly satisfactory.

An object of the present invention therefore, is to provide a novel form of apparatus for handling the strips as they are delivered from the mill which is not open to the disadvantages inherent in apparatus heretofore employed for the purpose. Further objects of the invention are to provide apparatus of the character aforesaid by means of which the strips can be very readily, rapidly and economically leveled and sheared into relatively short lengths preparatory to piling and which is of relatively simple construction and comparatively low cost; to provide apparatus for handling strip which is adapted for use with strips of different lengths and which does not require the shears associated therewith to be moved when the strips are of different lengths with the result that the shears can be arranged in permanently fixed position; and to provide apparatus which, because of its rapidity of action, efficiency, economy and simplicity, is more satisfactory than any other means of handling the strips which, so far as I am aware, has heretofore been suggested.

Other objects, advantages, operations and novel features comprehended by the invention are hereinafter more particularly pointed out or will be apparent to those skilled in the art from the following description of one form of apparatus embodying the invention and diagrammatically shown in the accompanying drawing; it is to be understood, however, that other forms of apparatus may be utilized if preferred.

In the said drawing, the single figure is a diagrammatic plan view of the said apparatus, which essentially comprises a run-out table, a series of parallel conveyor tables, a series of transfer tables and a plurality of shears, all as hereinafter more particularly set forth.

Referring now to the drawing, it will of course be understood that the strips are delivered successively by the delivery rolls D or other mechanism embodied in the mill onto the usual run-out table 1 which is long enough to receive and support each strip and may thus, for example, be something over 300′ in length. It is from this table that in accordance with the usual practice heretofore in vogue, the strip is bodily lifted by the crane or other suitable means and conveyed to some other point for leveling and shearing immediately after it is run out.

In accordance with the present invention, I provide at a suitable point adjacent the run-out table 1, a shear 2 which is adapted to shear the strip on the run-out table at a predetermined point, desirably, in accordance with the preferred practice of the invention, at a point about one-third of the way from the leading end of the strip to its rear end, so that after this shearing operation, the unsheared portion of the strip comprises about two-thirds of the initial length of the latter and the sheared portion about one-third. Adjacent the forward end of the run-out table 1, that is, the end most remote from the delivery mechanism D, I provide a transfer table 3 which is adapted to transfer the sheared portion of the strip to a conveyor table 4 disposed parallel to the run-out table and overlapping the forward end of the latter to a point substantially transversely aligned with the shear 2 which is desirably located in a fixed position. This conveyor table 4 extends beneath a shear 5 a short distance in front of a piling machine 6 or other mechanism adapted to pile or otherwise dispose of the relatively short pieces of the sheared portion of the strip after the latter has been progressively cut up by the shear 5 as it is carried beneath that shear on the table 4. Desirably a leveler 7 of any suitable construction is disposed adjacent the conveyor table 4 at a point about in transverse alignment with the forward end of the run-out table, so that as the sheared portion of the strip, after transference to the table 4, is carried toward the shear 5, it will pass beneath the leveler and be operated upon by the latter in the usual way.

It will thus be apparent that in accordance with my invention, the sheared portion of the strip, after being cut off by the shear 2, is moved on the table 3 to the conveying table 4 and then run down the latter beneath the leveler 7 to the shear 5 at which point it is severed into a plurality of short pieces of the length ultimately desired which are then carried to the piler 6 for piling or other disposition in the ordinary way.

Adjacent the run-out table 1 and extending substantially between the rear end thereof and the shear 2 and on the same side of the table as the transfer table 3, I provide another transfer table 8 adapted to transfer the unsheared portion of the strip to a second conveyor table 9 extending parallel to the table 4 from a point adjacent the rear end of the run-out table to a point preferably in line with the forward end of the table 4. Adjacent this table, so as to operate upon a strip as it is transported longitudinally therealong, a leveling machine 7' is preferably provided about in transverse alignment with the leveling machine 7, while a shear 5' and piling machine 6' are also arranged adjacent the forward end of the table, preferably respectively in transverse alignment with the shear 5 and piler 6. I also provide another shear 10 more nearly adjacent the rear end of the table 9, desirably about midway between the rear end of the table and the point thereof transversely aligned with the shear 2, the shear 10 being adapted to shear the theretofore unsheared portion of the strip immediately after it is carried to the table 9 through the medium of the transfer table 8, thus dividing the said unsheared portion into two, preferably substantially equal, parts.

Adjacent the conveyor table 9 and on the opposite side thereof from the table 4, I also provide still another conveyor table 11 extending parallel to the other conveyor tables and desirably from a point a little behind the shear 10 to a point opposite their forward ends, a shear 5" and piler 6" being arranged adjacent the table 11 in alignment with the other corresponding shears and pilers, while a leveler 7" may be disposed about opposite the shear 2. For transporting the leading or forward portion of the strip to the table 11 after it has been cut off by the shear 10, a third transfer table 12 is arranged between the rear portion of the table 11 and the table 9.

The specific form and construction of the shears, levelers, transfer, conveying and run-out tables is a matter of choice and consequently any preferred type of apparatus embodying my invention may be employed therefor as long as the same is satisfactorily operative for the performance of its intended function in accordance therewith.

In the operation of apparatus arranged and constructed substantially as just described, a strip is delivered by the mechanism D to the run-out table 1 and moved along the latter in the direction of the arrow adjacent thereto until it engages an adjustable stop 13, which is so set as to bring the strip to rest after its rear end has fully cleared the rolls or other delivery mechanism; when operating on strips of maximum length, the stop may desirably be arranged so as to locate the strip beneath the shear 2 with approximately one-third of the strip in front of the shear and two-thirds of the strip in rear thereof. The shear is now operated so as to sever the strip and the severed portion is immediately transferred by means of the transfer table 3 to the conveyor table 4 along which it is then moved in the direction of the arrow adjacent thereto beneath the leveler 7 and thence to the shear 5 where it is progressively cut up into the desired short lengths which are then consecutively received by the piler 6 in the usual way. Likewise, as soon as the strip has been cut by the shear 2, the unsevered or rear portion thereof is moved by means of the transfer table 8 to the conveyor table 9 and thus beneath the shear 10. This table may, if desired, be provided with an adjustable stop 14 disposed at a suitable point to correctly locate the strip with reference to the shear, and after the strip is disposed on the table the latter may be momentarily operated in one direction or the other so as to bring an end of the strip against the stop. Under many conditions of operation, however, the stop may be entirely dispensed with, particularly when the character of the transfer table is such as to avoid any material longitudinal movement of the unsevered portion of the strip as it is translated to table 9.

After the strip is properly positioned on this table, the shear 10 is operated so as to cut the strip in two portions preferably of substantially similar length. The leading or forward one of these two portions is then immediately moved by means of the transfer table 12 to the conveyor table 11 along which it is carried beneath the leveler 7'' to the shear 5'' where it is cut into the desired short lengths and the latter transferred to the piler 6''. As soon as the portion of the strip just referred to is out of the way, the second or rearmost portion is then moved forward on the conveyor table 9 beneath the lever 7' and then to the shear 5' where it is successively sheared and piled similarly to the other portions of the strip.

Thus, under normal operating conditions, the strip remains on the run-out table only so long as is required to shear it with the shear 2, and consequently the run-out table can be very readily cleared of the strip in ample time to permit delivery thereon of the succeeding strip, while the length of the conveyor and transfer tables and the speed at which they are operated is so calculated that those parts of each of them which are respectively designed to receive a portion of the strip from the preceding mechanism, whatever it may happen to be, are always clear for its reception before the said portion arrives.

It will thus be apparent that in accordance with my invention each strip after being disposed on the run-out table is successively divided into a plurality of relatively long lengths and that each of these lengths is then separately leveled and finally progressively cut into relatively short pieces. This method of handling the strip is therefore entirely at variance with the ordinary method in which the strip is bodily conveyed from the run-out table and then leveled and progressively cut into the relatively short pieces ultimately desired without any intermediate cutting into relatively long lengths which are thereafter separately leveled and cut. Moreover, it will be understood that while under most conditions the strips may be handled in accordance with my invention with a maximum of convenience and speed by providing, as shown in the drawing, three conveying tables and successively cutting the strip into three parts respectively adapted to be handled thereon, under certain circumstances it may be preferred to provide a greater or less number of conveyor tables and to cut the strips into a corresponding number of parts, and such an arrangement is entirely within the purview of the invention.

It will be further understood that the shears 2 and 10 are desirably arranged in permanently fixed relation with their respective conveyor tables and the latter provided with suitable movable stops such as 13 and 14 to facilitate the proper positioning of different length strips or pieces thereon with respect to the shears, this arrangement being advantageous in that it avoids the necessity for moving the relatively heavy shears longitudinally of the tables in accordance with the requirements of different classes of work, while the fact that all lifting of the strips is obviated is of advantage in the handling of wide strips and particularly adapts the invention for that class of work.

While I have herein described with considerable particularity a preferred embodiment of my invention, as the initial as well as the operating cost thereof is relatively low, I do not thereby desire or intend to specifically limit or confine myself thereto, as the same is capable of modifications in various particulars to meet different operating requirements or for like reasons, while other forms of apparatus than that to which I have chosen to specifically refer may be utilized if preferred, without departing from the spirit and scope of the invention as defined in the appended claims.

Having thus described my invention, I claim and desire to protect by Letters Patent of the United States:

1. Apparatus for handling elongated metal strips comprising a run-out table adapted to consecutively receive the strips, a plurality of conveyor tables disposed parallel to and respectively at different distances from the run-out table, a shear associated with the run-out table adapted to sever a strip disposed thereon, a transfer table adapted to transfer the severed portion of the strip to one of said conveyor tables, a transfer table adapted to transfer the unsevered portion of the strip to another of said tables, a shear associated with the last mentioned table adapted to sever said unsevered portion while disposed thereon, and a transfer table operative to transfer onto another of said conveyor tables one portion of said unsevered portion after the said shear has acted thereon.

2. Apparatus for handling elongated metal strips comprising a run-out table adapted to consecutively receive the strips, a conveyor table parallel to and laterally offset with respect to the run-out table, a shear adapted to sever a strip on the run-out table, transfer mechanism operative to move the severed portion of the strip to said conveyor table, a second conveyor table parallel to and laterally offset from the first conveyor table, transfer mechanism operative to move the unsevered portion of the strip thereto, a shear associated with said table adapted to sever the unsevered portion of the strip when disposed thereon, a third conveyor table parallel to and laterally offset with respect to the last mentioned conveyor table, and transfer mechanism operative to move one of the portions of the unsevered strip thereto from the second conveyor table after said strip has been severed thereon by said shear.

3. Apparatus for handling elongated metal strips comprising a run-out table adapted to consecutively receive the strips, a plurality of conveyor tables extending parallel to the run-out table and disposed at different distances therefrom, a shear associated with the run-out table, a shear associated with one of the conveyor tables, transfer mechanism operative to transfer from the run-out table to the most nearly adjacent conveyor tables separate portions of the strip after it has been sheared on the run-out table by the shear associated therewith, and other transfer mechanism adapted to transfer another portion of the strip to another of said conveyor tables after it has been sheared on that conveyor table having the second mentioned shear associated therewith.

4. Apparatus for handling elongated metal strips comprising a run-out table adapted to consecutively receive the strips, a series of conveyor tables arranged parallel to and at different distances from the run-out table, a shear associated with the run-out table, a shear associated with one of the conveyor tables lying between two of the other conveyor tables, transfer mechanism extending between the run-out table and the two conveyor tables most near adjacent thereto and a plurality of shears respectively associated with the several conveyor tables adjacent the ends thereof remote from the receiving end of the run-out table and adapted to progressively shear the strip material as it is moved beneath them on said conveyor tables.

5. Apparatus for handling elongated metal strips comprising a run-out table adapted to consecutively receive the strips, shearing means associated therewith, a conveyor table parallel to, laterally spaced from and partially overlapping the run-out table, transfer mechanism extending between the run-out table and said conveyor table, a second conveyor table parallel to the other table but more remote from the run-out table and substantially overlapping the latter, shearing means associated therewith in alignment with the run-out table, transfer mechanism extending between said table and the run-out table, a third conveyor table parallel to the other tables but still more remote from the run-out table, and transfer mechanism extending between said table and the second mentioned conveyor table.

6. Apparatus for handling elongated metal strips comprising a run-out table adapted to consecutively receive the strips, a conveyor table parallel to, laterally spaced from and partially overlapping the run-out table, transfer mechanism extending between the run-out table and said conveyor table, a second conveyor table parallel to the other table but more remote from the run-out table and substantially overlapping the latter, transfer mechanism extending between said table and the run-out table, a third conveyor table parallel to the other tables but still more remote from the run-out table, transfer mechanism extending between said table and the second mentioned conveyor table, a shear associated with the run-out table, a shear associated with the second conveyor table in transverse alignment with the run-out table, and a shear associated with each conveyor table adjacent that end thereof most remote from the receiving end of the run-out table and adapted to progressively shear strip material as it is moved along said conveyor tables.

7. Apparatus for handling elongated metal strips comprising a run-out table adapted to consecutively receive the strips, a conveyor table parallel to, laterally spaced from and partially overlapping the run-out table, transfer mechanism extending between the run-out table and said conveyor table, a second conveyor table parallel to the other table but more remote from the run-out table and substantially overlapping the latter, transfer mechanism extending between said table and the run-out table, a third conveyor table parallel to the other tables but still more remote from the run-out table, transfer mechanism extending between said table and the second mentioned conveyor table, a shear associated with the run-out table, a shear associated with the second conveyor table in transverse alignment with the run-out table, and a leveler and a shear associated with each conveyor table and respectively adapted to operate on strip material while moving longitudinally therealong.

In witness whereof I have hereunto set my hand this 8th day of August, 1930.

CARL G. OHLSON.